(12) United States Patent
Mizuguchi

(10) Patent No.: US 7,721,327 B2
(45) Date of Patent: May 18, 2010

(54) INFORMATION INPUT-OUTPUT DEVICE, INFORMATION INPUT-OUTPUT SYSTEM, MOBILE COMMUNICATION TERMINAL, AND INPUT-OUTPUT CONTROL UNIT

(75) Inventor: Takahiro Mizuguchi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1290 days.

(21) Appl. No.: 10/970,993

(22) Filed: Oct. 25, 2004

(65) Prior Publication Data

US 2005/0071683 A1 Mar. 31, 2005

Related U.S. Application Data

(62) Division of application No. 09/615,844, filed on Jul. 13, 2000, now Pat. No. 7,010,695.

(30) Foreign Application Priority Data

Jul. 16, 1999 (JP) ............................... 11-203857

(51) Int. Cl.
*H04L 29/06* (2006.01)
*G06F 9/00* (2006.01)

(52) U.S. Cl. ............................ 726/5; 380/51

(58) Field of Classification Search ................ 713/155, 713/169, 170, 185, 156; 709/203, 219, 224, 709/225; 726/2, 5, 10, 11, 12
See application file for complete search history.

(56) References Cited

U.S. PATENT DOCUMENTS

| | | | |
|---|---|---|---|
| 5,249,230 A | | 9/1993 | Mihm |
| 6,012,083 A | | 1/2000 | Savitzky et al. |
| 6,044,382 A | * | 3/2000 | Martino ...................... 715/234 |
| 6,330,490 B1 | | 12/2001 | Kim et al. |
| 6,366,967 B1 | * | 4/2002 | Wagner ........................ 710/33 |
| 6,434,700 B1 | * | 8/2002 | Alonso et al. ................ 713/169 |
| 6,460,036 B1 | * | 10/2002 | Herz ............................ 707/10 |
| 6,549,625 B1 | | 4/2003 | Rautila et al. |
| 6,574,604 B1 | | 6/2003 | Van Rijn |
| 6,594,692 B1 | * | 7/2003 | Reisman ...................... 709/219 |
| 6,615,353 B1 | * | 9/2003 | Hashiguchi ................. 713/185 |

FOREIGN PATENT DOCUMENTS

| | | |
|---|---|---|
| EP | 0 973 350 A2 | 1/2000 |
| JP | 6-261362 | 9/1994 |
| JP | 6-326818 | 11/1994 |
| JP | 7-066771 | 3/1995 |
| JP | 10-222527 | 8/1998 |
| JP | 10222527 | 8/1998 |
| WO | WO00/00972 | 1/2000 |
| WO | WO 00/48076 | 8/2000 |

\* cited by examiner

*Primary Examiner*—Gilberto Barron, Jr.
*Assistant Examiner*—Abdulhakim Nobahar
(74) *Attorney, Agent, or Firm*—Dickstein Shapiro LLP

(57) ABSTRACT

An information input-output system comprises a mobile communication terminal, and a host computer that performs communications with the terminal over a radio transmission line and has a database relating to services that can be provided to the user of the terminal. This system also comprises an input-output gateway server that verifies whether the user is a subscriber who can be provided with a variety of services, and an input-output control unit that receives data from the database over an established line and then outputs the data.

15 Claims, 10 Drawing Sheets ially received information for the
place of departure and the destination, and edits a road map
(step S113). When the transportation mode is a train (step
S112, railway), the service center searches information for
timetables from the existing database based on the simultaneously received information for the place of departure and
the destination, and edits a railway timetable covering from
the place of departure to the destination (step S114).

The service center then performs the processing of creating
information incidental to the information edited at step S113
and step S114 (step S115). At this step, the service center
creates information for sightseeing around the destination
and weather information. The service center then specifies a
spot (a printer or a display of the PDA), to which the information created so far is to be output (step S116), based on the
target device for data output specified by the user (step S104).

For example, when the display of the PDA is specified (step
S104: user's device, step S116: PDA), the service center
transmits the previously created information to the PDA (step
S117), and the PDA then outputs the information onto the
display (step S105).

On the other hand, when the printer is specified (step S104:
another printer, step S116: another printer), the service center
searches various types of facilities (e.g., convenience stores,
gas stations, SA, or tollbooths on a highway) where the same
type of printer as that stored in the database is located, creates
a list of candidates for a target device for output, and transmits
the list to the PDA (step S118). The PDA then displays the list
on its screen (step S106), the user selects a target device for
output of the candidates, and transmits the information for the
specified target device for output (step S107). At the last step,
the service center receives the information for the specified
target device for output (step S119), and controls so as to
permit the printer, that is specified as a target device for
output, to print out the information such as the map or the
timetable previously created (step S120).

As explained above, in the conventional information input-output system, even when the user of the portable information
device (PDA or the like) is on the road, a target device for
output can selectively be changed according to changes of a
destination based on the service provided from the service
center. Therefore, desired information can easily be output
onto a printer installed in a specified location.

In the conventional information input-output system, however, user authentication is not confirmed in an input-output
control unit for a printer or so as an object for output. Therefore, printout becomes possible by anybody operating this
terminal (a portable information device, or a mobile communication terminal such as a PHS or a cellular phone). Namely,
there has been a problem that reliability of security of information can not be ensured, because the user of the mobile
communication terminal is not verified whether he or she is an
authorized holder of this terminal.

INFORMATION INPUT-OUTPUT DEVICE, INFORMATION INPUT-OUTPUT SYSTEM, MOBILE COMMUNICATION TERMINAL, AND INPUT-OUTPUT CONTROL UNIT

This application is a divisional of application Ser. No.
09/615,844 filed Jul. 13, 2000 now U.S. Pat. No. 7,010,695,
which is hereby incorporated by reference in its entirety. This
application also claims priority to Japanese Patent Application No. JP 11-203857, filed Jul. 16, 1999.

FIELD OF THE INVENTION

The present invention relates to an information input-output device and an information input-output system which
allows a user to retrieve information from a host computer
using a mobile communication terminal. More particularly,
this invention relates to an information input-output device
and an information input-output system which enables input
or output of information after the user is authenticated.

BACKGROUND OF THE INVENTION

A conventional information input-output system is
explained below. In recent years, portable information
devices such as note PCs and PDAs (Personal Digital Assistants) and mobile communication terminals such as PHSs
(Personal Handy-Phone System) and cellular phones have
been widely used. In association with the widespread use of
these devices, the processing of creating documents or the
processing of communications by electronic mail can easily
be performed wherever the devices may be used. Further, by
using a communication function provided in these devices, a
variety of services (e.g., services of banks (reference to balance, money transfer to an account, or so), booking of tickets,
or booking of airline tickets) can be provided from carriers
over a network (communication line).

However, these conventional portable information devices
carry no printer to print out created documents and information obtained through the variety of services. Therefore, printout cannot easily be performed on the road, for example. To
solve the problem, there has been proposed an information
input-output system which allows a user of the portable information device to instruct printout of desired information to a
spot (printer) in a destination (the place where the user goes)
specified by the user of the portable information device.

FIG. 11 is a flow chart showing the processing of information output in the information input-output system described
in JP, HEI 10-222527A. This chart shows the processing
between a PDA and a service center that provides the service
to print out desired information onto a specified spot in a
destination. FIG. 11 specifically shows a case in which a user
is provided with a travel information service.

The user of a PDA selects a travel information service out
of a variety of services by input operation through the PDA
(step S101). The user then inputs search/output request data
indicating information for a destination where the user goes,
namely a place of departure, a destination, a mode of transportation, and a target device for data output, or so (step S102)
through the PDA, and transmits search/output demand information relating to this search/output request data to a service
center (step S103).

On the other hand, the service center receives the search/
output demand information (step S111) and checks a mode of
transportation (step S112). For example, when the transportation mode is a car (step S112, vehicle), the service center
searches geographical information from an existing database

SUMMARY OF THE INVENTION

It is an object of this invention to obtain an information
input-output device, an information input-output system
which allows a user of a mobile communication terminal to
easily access information within a host computer that provides a variety of services. Further, this information input-output system enables easy input or output of the information
after the user of an input-output control unit is authenticated
through operation with the terminal.

According to one aspect of this invention, by entering an
authentication code into an input-output control unit through
operation with a terminal or a keyboard, only the user of this terminal, who knows this particular authentication code, retrieves desired data stored in a service provision unit. Namely, only when the user of the terminal is verified as a holder (subscriber) of this terminal, it is allowed to output the desired data. Therefore, with regard to the security of the information, higher reliability can be ensured as compared to that of the conventional method.

According to another aspect of this invention, by entering an authentication code into an input-output control unit through operation with a terminal, only the user of this terminal, who knows this particular authentication code, outputs desired data through the terminal. Namely, only when the user of the terminal is verified as a holder (subscriber) of this terminal, it is allowed to output the desired data. Therefore, with regard to the security of the information, higher reliability can be ensured as compared to that of the conventional method.

Further, the user of the terminal enters a user ID into an input-output control unit through a terminal or a keyboard, and then transmits an output command (output job code) after the user is authenticated. In response to reception of the code, the input-output control unit provides controls for output. Therefore, the output job code is transmitted only when output is required.

Further, with regard to the settlement of charging, charging can surely be settled by using any device such as a cash collection device into which a specified amount of cash is previously inserted, or electronic cash.

Further, since a map is displayed on the screen of the terminal, any of input-output control units, that are installed around the location where the user is, can efficiently be specified.

According to still another aspect of this invention, by entering an authentication code into an input-output control unit through operation with its keyboard, only the user of this input-output control unit, who knows this particular authentication code, retrieves data within a service provision unit. Namely, only when the user of this input-output control unit is verified as a subscriber who can access the data within the service provision unit, it is allowed to output the desired data. Therefore, with regard to the security of the information, high reliability can be ensured.

According to still another aspect of this invention, by entering an authentication code into an input-output control unit through operation with its keyboard, only the user of this input-output control unit, who knows this particular authentication code, retrieves data within another input-output control unit. Namely, only when the user of the specified input-output control unit is verified as a subscriber who can access the data within another input-output control unit, it is allowed to output the desired data. Therefore, with regard to the security of the information, high reliability can be ensured.

Further, the input-output control unit has devices such as a printer and a storage device (memory) as external equipment for output.

Further, the input-output control unit has devices such as a sound-source data playback device and a storage device (memory) as external equipment for output.

Further, the input-output control unit has devices such as a color printer, a digital camera, and a storage device (memory) as external equipment for output.

According to still another aspect of this invention, an authentication code is entered into an input-output control unit through operation with a terminal. Therefore, only when the user of this terminal is verified as a holder (subscriber) of this terminal, it is allowed to output desired data.

According to still another aspect of this invention, with regard to the settlement of charging, charging can surely be settled by using any device such as a cash collection device into which a specified amount of cash is previously inserted, or electronic cash.

Other objects and features of this invention will become understood from the following description with reference to the accompanying drawings.

DETAILED DESCRIPTION OF THE PREFERRED EMBODIMENTS

Preferred embodiments of the information input-output system according to this invention are explained in detail below with reference to the drawings. It should be noted that the present invention is not limited by these embodiments.

Figure 1:
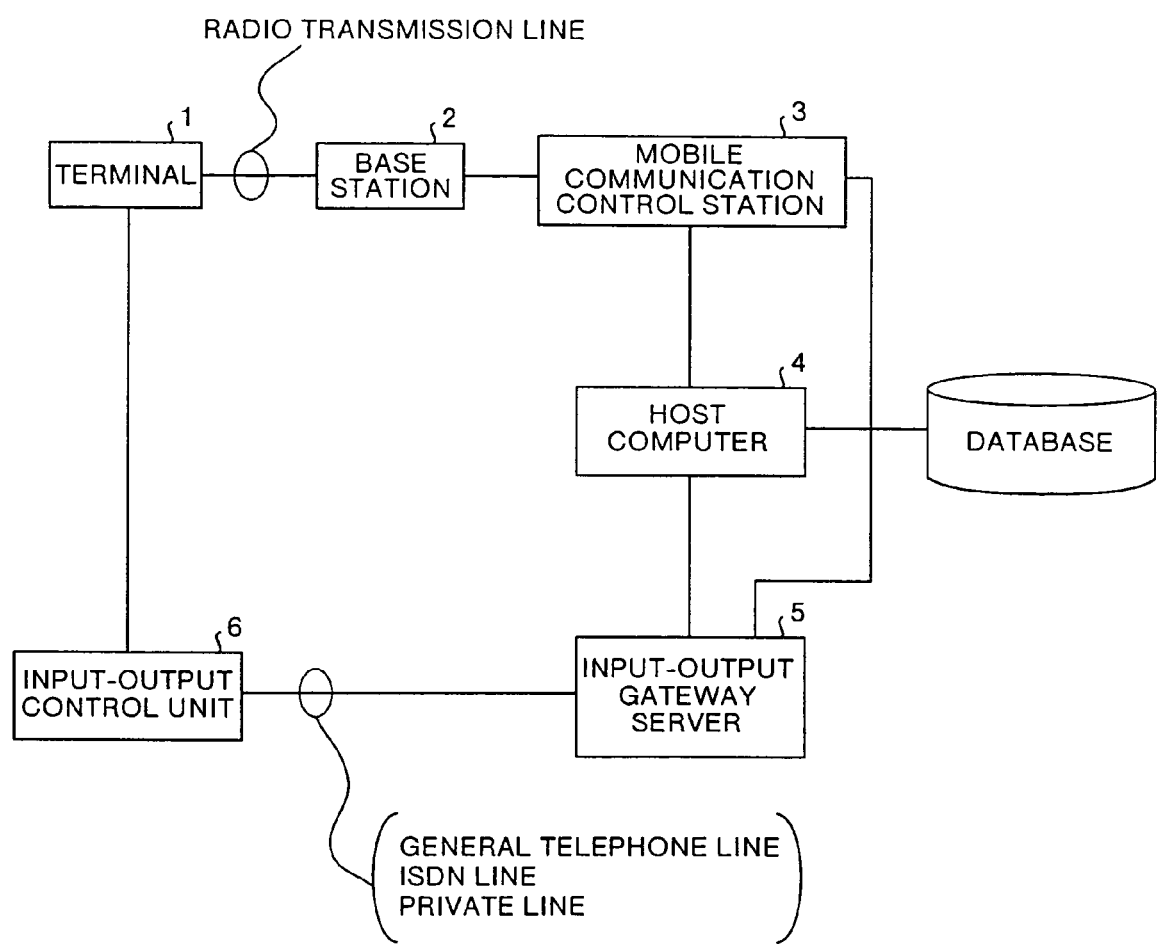
FIG. 1 shows a configuration of a first embodiment of the information input-output system according to this invention.

FIG. 1 shows a configuration of a first embodiment of the information input-output system according to this invention. In FIG. 1, reference numeral 1 represents a portable information device or a mobile communication terminal (henceforth, terminal 1) such as a PHS or a cellular phone. More specifically, the device or the terminal can get easy access to information in a host computer, that provides a variety of services, through operation with its display screen. Further, each of them transmits an authentication code, that is used for verification whether a user operating the device can access the information, to an input-output control unit explained below. The cellular phone mentioned here employs a communication system of FDMA (Frequency Division Multiple Access), TDMA (Time Division Multiple Access), or CDMA (Code Division Multiple Access).

Reference numeral 2 represents a radio base station (henceforth, base station 2) that performs communications with the terminal 1 over a radio transmission path. Reference numeral 3 represents a mobile communication control station (or a computer in the mobile communication control station)

that allocates a target device for connection according to a destination of transmission from the terminal 1. Reference numeral 4 represents a host computer that has a database relating to services that can be provided to the user of the terminal 1. Reference numeral 5 represents an input-output gateway server that stores data sent from the host computer 4 and transmits the data to an external device connected to the server through a line (a general telephone line, an ISDN line, or a private line). Reference numeral 6 represents an input-output control unit that controls an external device (printer, or so) based on the data from the input-output gateway server 5.

In the input-output control unit 6 of this embodiment, the term "input" indicates entry of information from an input device such as a scanner and a digital camera, and wired or wireless external communication equipment. The term "output" indicates output of information to a printer, a recording medium, an image processor, a sound-source data playback device, and wired or wireless external communication equipment. The data from the host computer 4 includes text data (newspapers or publications, etc.), binary data, facsimile data, image data (photos, video, etc.), or sound source data. The input-output control unit 6 is installed in a plurality of locations in order to support the mobile terminal 1. Therefore, in this embodiment, desired data is output to any of the input-output control units located around the destination where the user goes according to changes of the destination.

Figure 2:
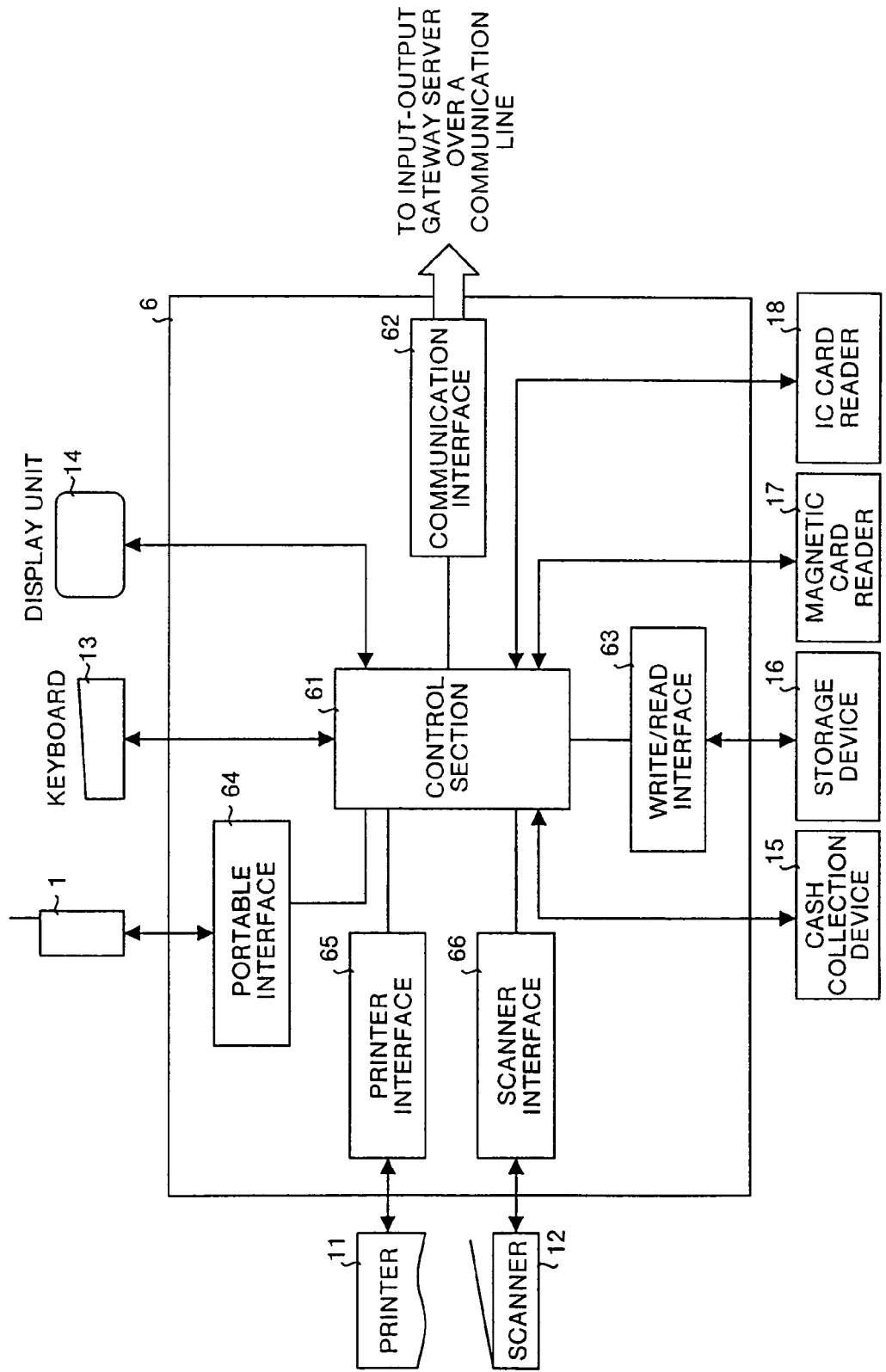
FIG. 2 shows a detailed configuration within an input-output control unit 6 and a configuration around the input-output control unit 6.

FIG. 2 shows a detailed configuration within the input-output control unit 6 and a configuration around the input-output control unit 6. In FIG. 2, reference numeral 61 represents a control section that controls operation of the input-output control unit 6. Reference numeral 62 represents a communication interface that performs data transaction with the input-output gateway server 5, 63 a write/read interface to store data in an FD and an MO, or the like, and 64 a portable interface that performs communications with the terminal 1. Reference numeral 65 represents a printer interface connected to a printer (or any other external device for output of information), and 66 a scanner interface connected to a scanner (or any other external device for entry of information).

Figure 3:
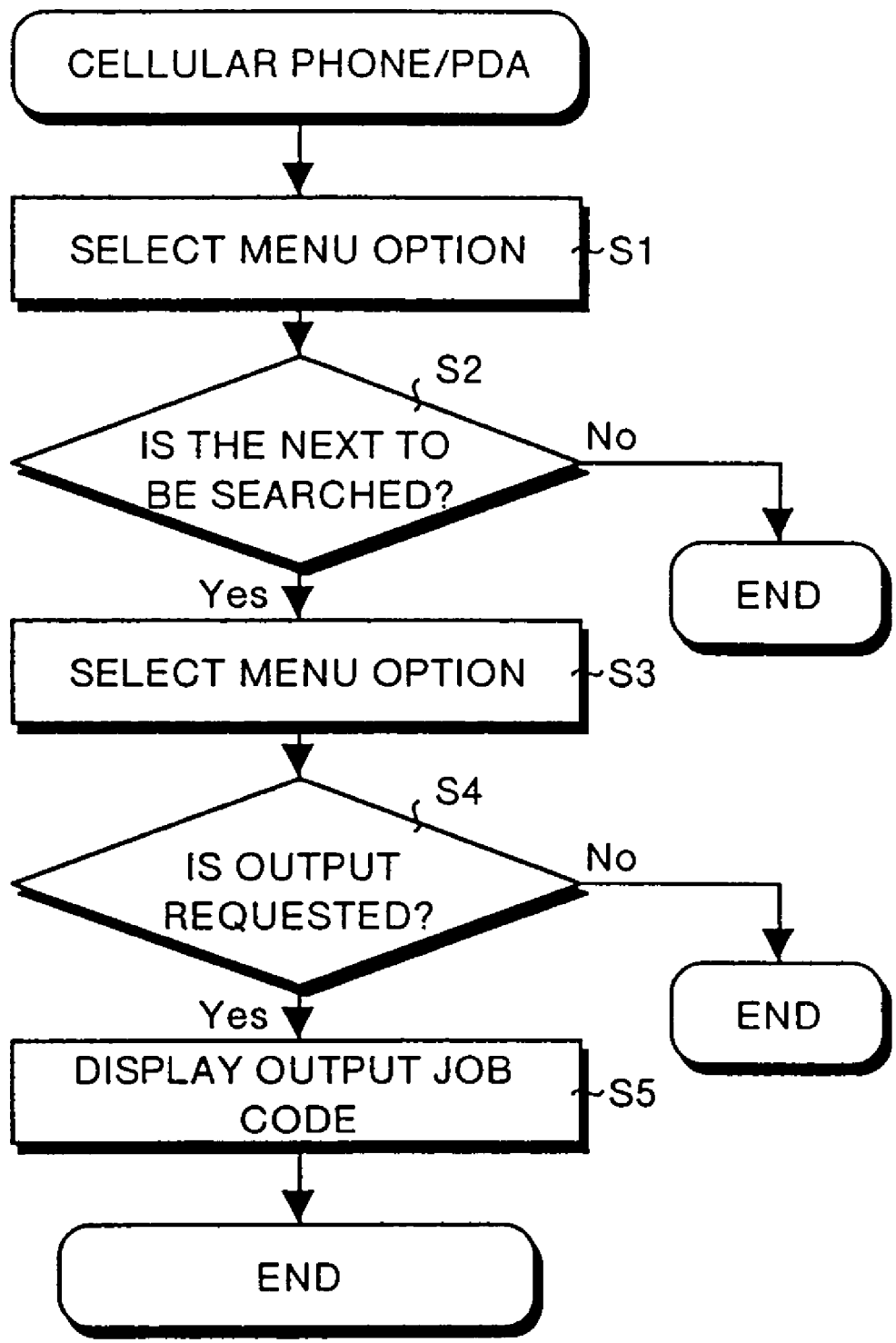
FIG. 3 shows a flow chart of the processing in a terminal 1 (addressing first control and second control)

Operation of the information input-output system based on the above configuration is explained below with reference to FIG. 3, FIG. 4, FIG. 5, and FIG. 6. FIG. 3 shows a flow chart of the processing in the terminal 1 (addressing first control and second control), and FIG. 5 shows an example of the operation for the first control and the second control in the information input-output system. More specifically, FIG. 5 shows operations since the user of the terminal 1 operates its display until information within a host computer 4, that provides a variety of services, is transmitted to the input-output gateway server 5.

Figure 4:
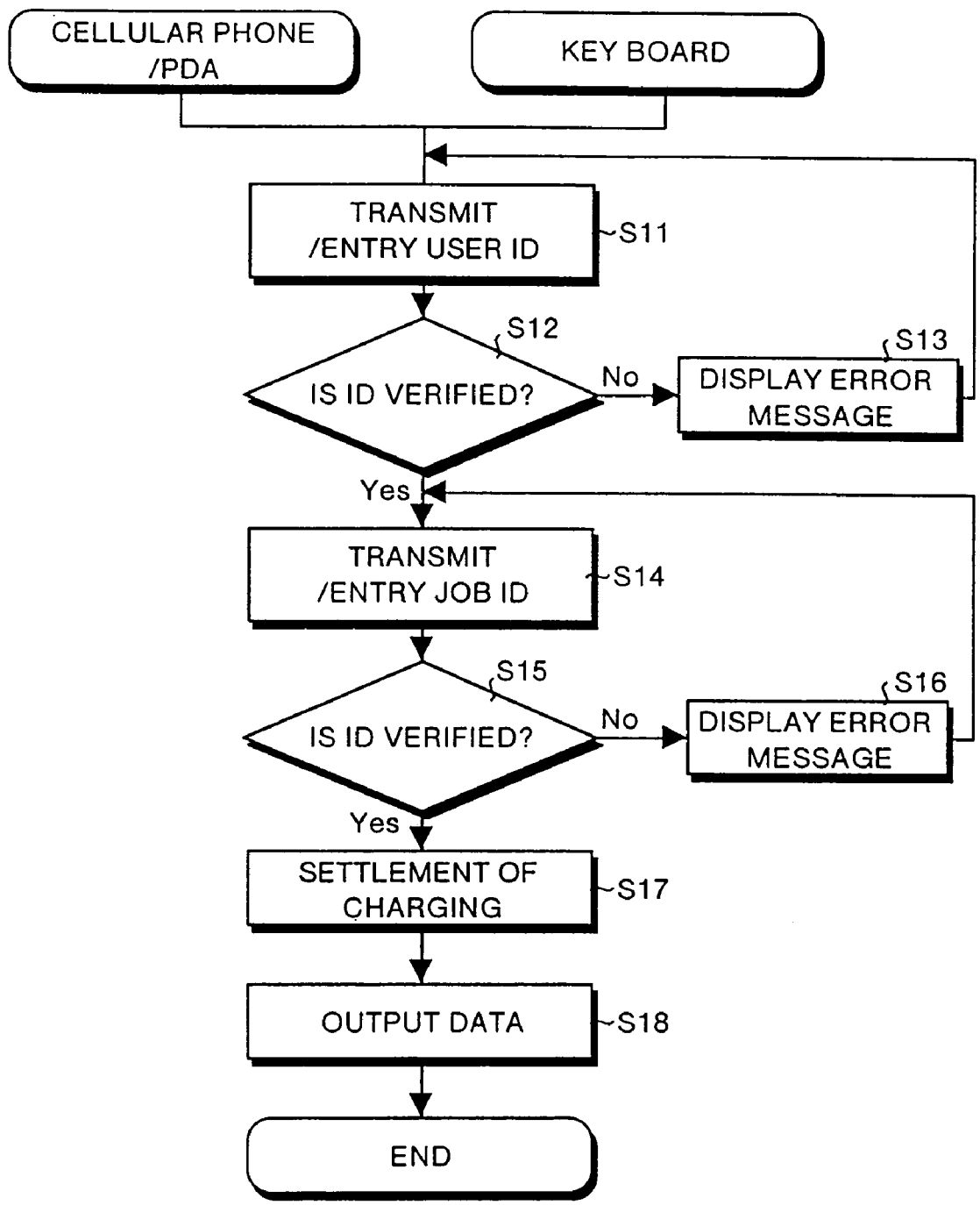
FIG. 4 shows a flow chart of the processing in the terminal 1 (addressing third control) and the settlement of charging.
Figure 5:
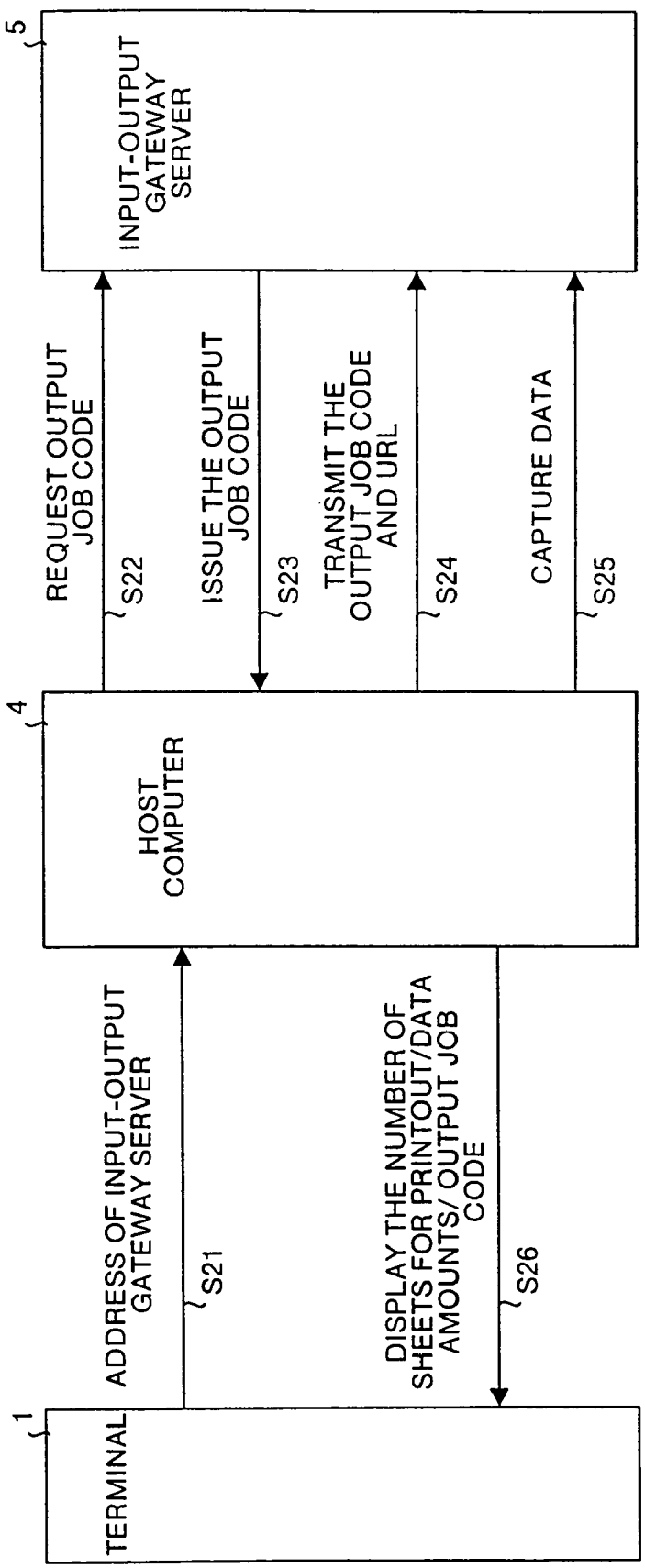
FIG. 5 shows an example of the operation for the first control and the second control in the information input-output system.
Figure 6:
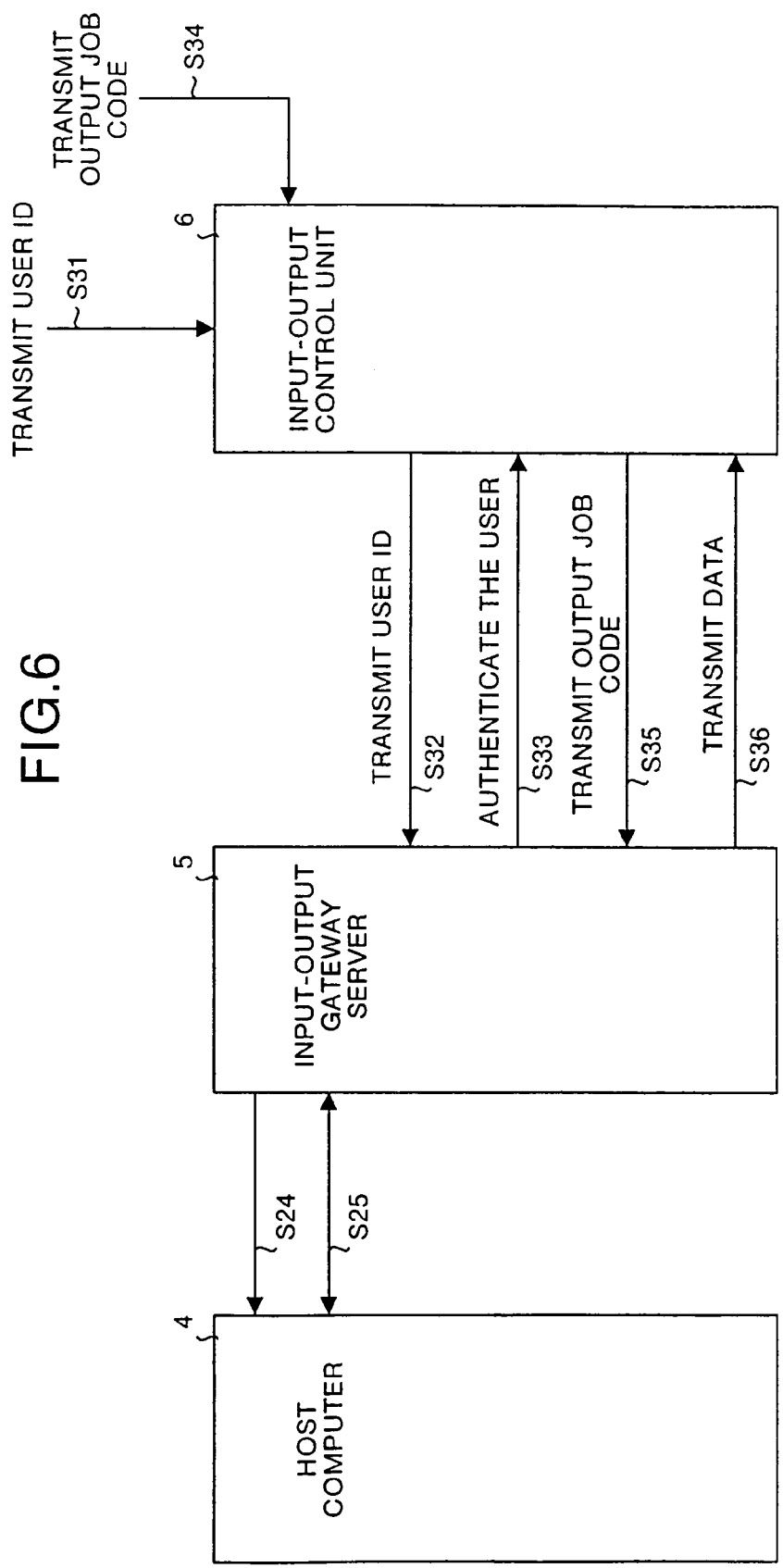
FIG. 6 shows the operation for the third control in the information input-output system.

FIG. 4 shows a flow chart of the processing in the terminal 1 (addressing third control) and the settlement of charging. FIG. 6 shows the operation for the third control in the information input-output system. More specifically, FIG. 6 shows operations, by operating the terminal 1, since the input-output gateway server 5 transmits the information stored in the server 5 to the input-output control unit 6 after the user of the terminal 1 is authenticated until the input-output control unit 6 outputs the received information to an external device such as a printer.

As the first control, the user of the terminal 1 selects desired processing (main options: access to bank, purchase of a ticket or an airline ticket, etc.) out of menu options appearing on the screen (step S1), and then proceeds to the next operation (step S2, Yes). If the user does not proceed to the next operation (Step S2, No), the processing is terminated at this point in time. The processing here comes to the point that the terminal 1 and the host computer 4 communicate with each other via the base station 2 and the mobile communication control station, and from then on, the menu option under the control of the host computer 4 is selected in the terminal 1.

As the second control, the user of the terminal 1 selects desired processing (sub-options: information to be output and displayed, or information to be output and printed out, etc.) out of the menu options appearing on the screen controlled from the host computer 4 (step S3), and proceeds to the next operation (step S4, Yes).

At the same time, an address of the input-output gateway server 5 corresponding to "printout" as one of the menu options, for example, is transmitted from the terminal 1 (step S21). The host computer 4 receives this address, and then requests an output job code, that is required when printout is performed, to the input-output gateway server 5 corresponding to the address (step S22).

The input-output gateway server 5 receives this request, and then issues the output job code corresponding to the processing of printout (step S23). The host computer 4 receives the output job code, and then transmits a URL (Uniform Resource Locator) indicating a site, where the information to be output is stored, to the input-output gateway server 5 (step S24). As the last processing in the second control, the input-output gateway server 5 reads out data to be output from a database based on the URL, and temporarily stores the data (step S25). Whereas, the host computer 4 controls so as to display information such as the number of sheets for printout, the data amounts, and the output job code onto the terminal 1 (step S26). If the operation is stopped during the processing at step S4 (step S4, No), for example, the processing is terminated at this point in time.

As the third control, the user of the terminal 1 enters a user ID (e.g., secret number or own telephone number) into the input-output control unit 6 through operation with the terminal 1 or operation of a keyboard 13 (step S11, step S31). The input-output control unit 6 receives the user ID and then transmits the received user ID to the input-output gateway server 5 (step S32). The input-output gateway server 5 compares the received ID with the ID previously stored inside the server 5. When these two IDs match (step S12, Yes), the input-output gateway server 5 authenticates that the user of the terminal 1 can access the previously stored data (step S33). If these two fail to match (step S12, No), the input-output gateway server 5 provides controls for displaying an error message onto the terminal 1 (step S13), and the user inputs the user ID again (step S11).

The user of the terminal 1, who has been authenticated by the input-output gateway server 5, transmits the output job code previously displayed under the second control to the input-output control unit 6 through operation with the terminal 1 or operation of the keyboard 13 (step S14, step S34). The input-output control unit 6 then transmits the received output job code to the input-output gateway server 5 (step S35).

The input-output gateway server 5 compares the received output job code with the output job code received under the second control. When these two codes match (step S15, Yes), the input-output control unit 6 performs the settlement of charging involved by the output processing (step S17). As the last processing in the third control, the input-output control unit 6 reads out the data previously stored in the input-output gateway server 5, and outputs (prints) the data onto an external device such as a printer installed in any location the nearest to the location where the user is (step S18, step S36). In order to specify any printer installed in the nearest location, a route to the location may also be displayed on the terminal 1. Further, if these two fail to match in the processing at step S15 (step S15, No), the input-output control unit 6 controls so as to display an error message on the terminal 1 (step S16), and the user inputs again the output job code (step S14).

Figure 7:
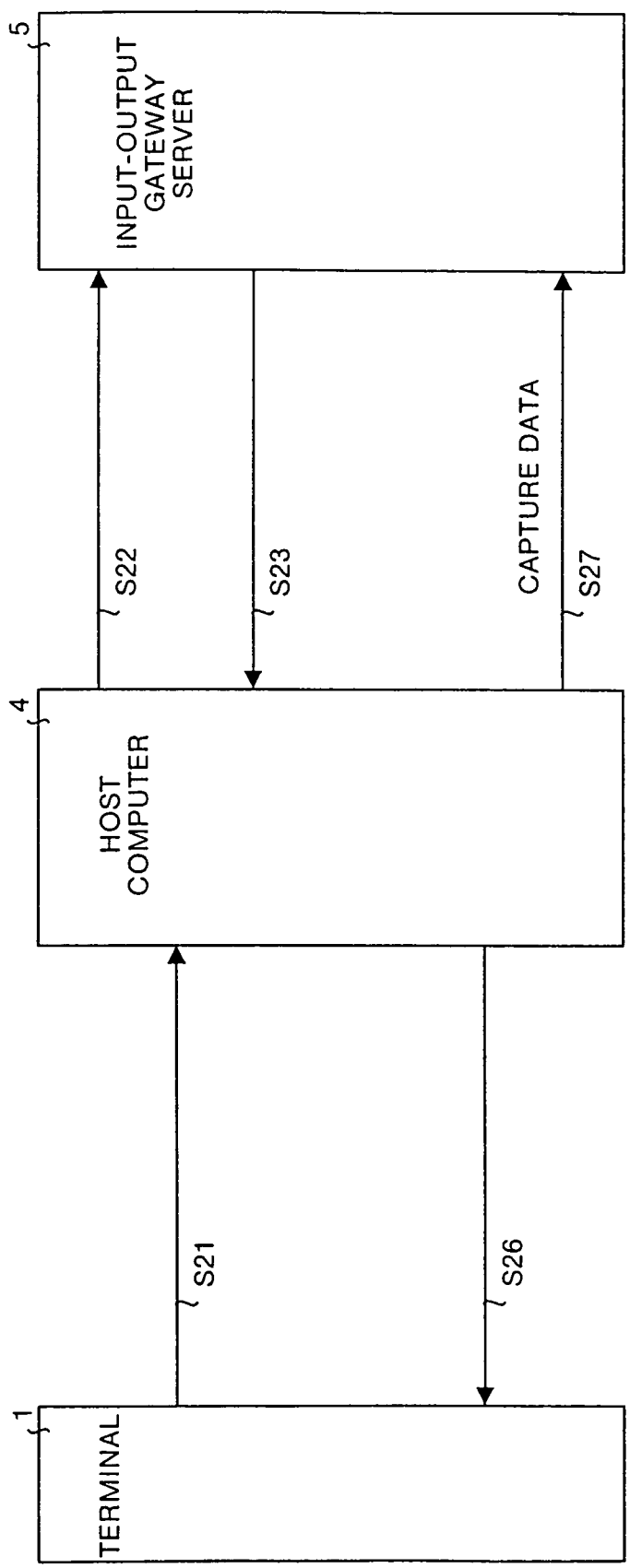
FIG. 7 shows an example of the operation for the first control and the second control in the information input-output system.

Although the user ID is input through operation with the terminal 1 or operation of the keyboard in this embodiment, in addition to this method, the user ID may be input using the magnetic card or the IC card shown in FIG. 2. Further, for the settlement of charging in this embodiment, a cash collection device, into which a specified amount of cash is previously inserted, may be used, or electronic cash may also be used. Under the second control in this embodiment, although data as an object to be output is captured into the input-output gateway server 5 based on the URL, as shown in FIG. 6, a capturing method is not limited to this method. That is, instead of using the URL, the host computer 4 may directly transmit data as an object to be output to the input-output gateway server 5 through operation from the terminal 1, as shown in FIG. 7. The mobile communication control station 3 and the host computer 4 may be integrated into one configuration.

According to this embodiment, by entering the user ID into the input-output control unit 6 through operation with the terminal 1 or operation of the keyboard 13, only the user of the terminal 1, who knows this particular ID, is allowed to output (print) desired data stored in the input-output gateway server 5. Namely, only when the user of the terminal 1 is verified as a holder (subscriber) of the terminal 1, it is allowed to output the desired data. Therefore, with regard to the security of the information, higher reliability can be ensured as compared to that of the conventional method. Accordingly, in this embodiment, the user of the terminal 1 can easily access the information within the host computer 4 that provides a variety of services. Further, the information can easily be output onto an external device while the security of the information can be ensured.

According to this embodiment, the user of the terminal 1 inputs the user ID into the input-output control unit 6 from the terminal 1 or the keyboard 13, and transmits the output job code after the user is authenticated. In response to reception of this code, the input-output control unit 6 provides controls for output. Therefore, in this embodiment, an output job code is transmitted only when output is required. As a result, a communication fee of waste is eliminated.

Further, according to this embodiment, with regard to the settlement of charging, charging can surely be settled by using any device such as a cash collection device 15 into which a specified amount of cash is previously inserted, or electronic cash.

Figure 8:
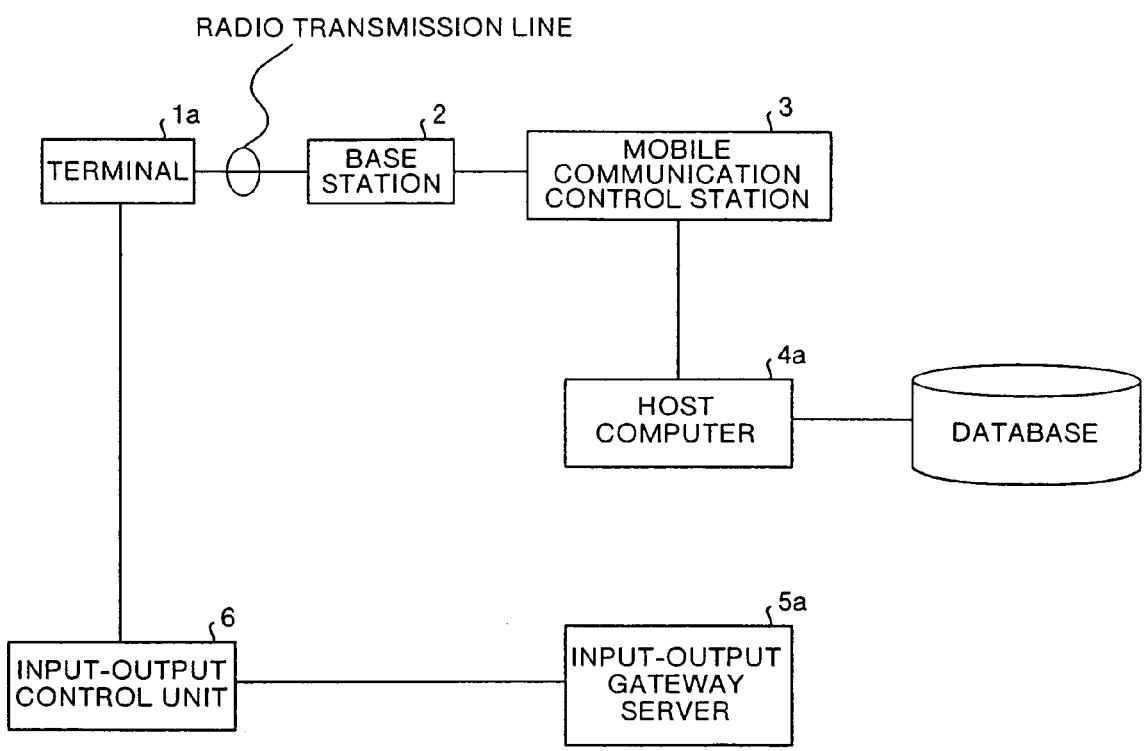
FIG. 8 shows a configuration of a second embodiment of the information input-output system according to this invention.

FIG. 8 shows a configuration of a second embodiment of the information input-output system according to this invention. In FIG. 8, reference numeral 1a represents a portable information device or a mobile communication terminal (henceforth, terminal 1) such as a PHS or a cellular phone, the same as that of the first embodiment. More specifically, the device or the terminal can get easy access to information in a host computer, that provides a variety of services, through operation with its display screen. Further, each of them transmits an authentication code, that is used for verification whether a user operating the device can access the information, to an input-output control unit explained below. A different point of the terminal 1a from the terminal 1 of the first embodiment is that, when the processing of output (printing) is performed, for example, the terminal 1a directly receives data to be output from a host computer and transmits the data to an input-output control unit.

Reference numeral 4a represents a host computer having a database relating to services that can be provided to the user of the terminal 1a, and transmits the data to be output to the terminal 1a via the mobile communication control station 3 and the base station 2. Reference numeral 5a represents an input-output gateway server that performs user authentication with the input-output control unit 6 connected to the server through a line (a general telephone line, an ISDN line, or a private line). The rest of the configuration is the same as that of the previously explained first embodiment. Therefore, the same signs are assigned to the sections corresponding to those in the first embodiment, and explanation of the sections are omitted.

Operation of the information input-output system based on the above configuration is explained below. The first control is the same as that of the first embodiment, explanation of the control is omitted. As the second control, the user of the terminal 1a selects desired processing (sub-options: information to be output and displayed, or information to be output and printed out, etc.) out of the menu options appearing on the screen controlled from the host computer 4a.

At the same time, a command corresponding to "printout" as one of the menu options, for example, is transmitted from the terminal 1a. The host computer 4a receives this command, and then reads out data to be output from the database, and transmits the data to the terminal 1a. At the last step, the host computer 4a transmits information such as the number of sheets for printout and the data amounts to the terminal 1a.

As the third control, the user of the terminal 1a enters a user ID (e.g., secret number or own telephone number) into the input-output control unit 6 through operation with the terminal 1 or operation of the keyboard 13. The input-output control unit 6 receives the user ID and then transmits the received user ID to the input-output gateway server 5a. The input-output gateway server 5a compares the received ID with the ID previously stored inside the server 5a. When these two IDs match, the input-output gateway server 5a authenticates that the user of the terminal 1a can access the previously stored data. If these two fail to match, the input-output gateway server 5a provides controls for displaying an error message onto the terminal 1a, and the user inputs the user ID again.

The user of the terminal 1a, who has been authenticated by the input-output gateway server 5a, transmits the previously stored data under the second control to the input-output control unit 6 through operation with the terminal 1a. The input-output control unit 6 then performs the settlement of charging involved by the processing for output (in the same manner as that of the first embodiment). As the last processing of the third control, the input-output control unit 6 then outputs (prints) the data from the terminal 1a onto an external device such as a printer installed near the location where the user is. In this embodiment, the processing for user authentication is not limited to the processing as explained above, but the processing may be performed by using the method explained in the first embodiment.

According to this embodiment as explained above, by entering a user ID into the input-output control unit 6 through operation with the terminal 1a, only the user of the terminal 1a, who knows this particular ID, is allowed to output (print out) desired data. Namely, only when the user of the terminal 1a is verified as a holder (subscriber) of the terminal 1a, it is allowed to output the desired data. Therefore, with regard to the security of the information, higher reliability can be ensured as compared to that of the conventional method. Accordingly, in this embodiment, the user of the terminal 1a can easily access the information within the host computer 4a that provides a variety of services. Further, the information can easily be output onto an external device while the security of the information can be ensured.

According to this embodiment, the user of the terminal 1a enters the user ID into the input-output control unit 6 from the terminal 1a or the keyboard 13, and transmits desired data after the user is authenticated. In response to reception of the data, the input-output control unit 6 provides controls for output. Therefore, in this embodiment, the desired data is transmitted only when output is required. As a result, a communication fee of waste is eliminated.

Further, according to this embodiment, with regard to the settlement of charging, charging can surely be settled by using any device such as a cash collection device 15 into which a specified amount of cash is previously inserted, or electronic cash.

Figure 9:
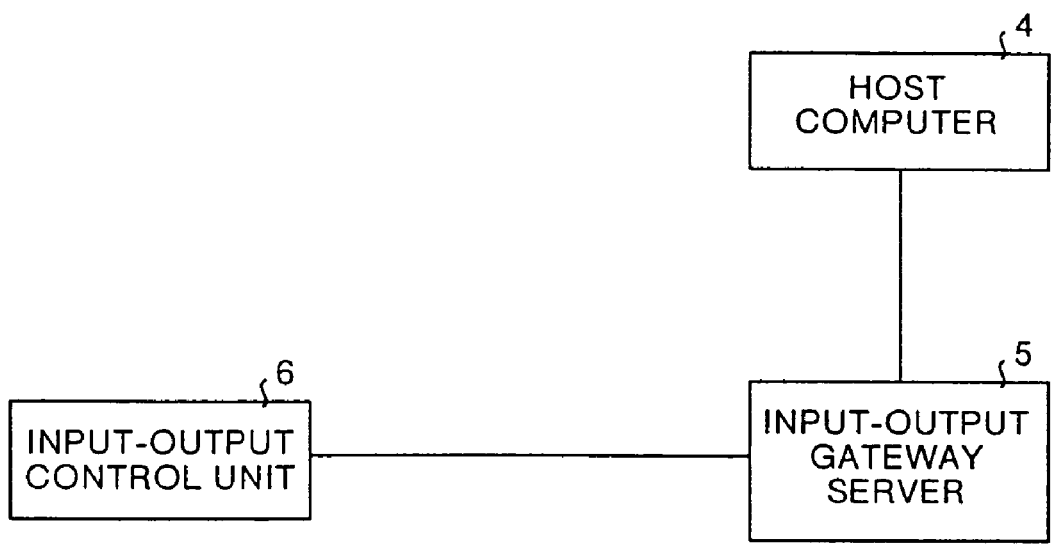
FIG. 9 shows a configuration of a third embodiment of the information input-output system according to this invention.

FIG. 9 shows a configuration of a third embodiment of the information input-output system according to this invention. The operation of each section provided in FIG. 9 is the same as that of the first embodiment. Therefore, the same signs are assigned to the sections, and explanation of the sections are omitted.

Operation of the information input-output system based on the above configuration is explained below. In this embodiment, when data within the host computer 4 is to be output, a user ID (e.g., secret number) is entered from the input-output control unit 6 to the input-output gateway server 5 through operation with its keyboard 13. In response to reception of the ID, the input-output gateway server 5 compares the received ID with the ID previously stored inside the server 5. When these two IDs match, the input-output gateway server 5 authenticates that the user of the input-output control unit 6 can access the data within the host computer 4. If these two fail to match, the input-output gateway server 5 provides controls for displaying an error message onto the input-output control unit 6, and the user inputs the user ID again.

The user of the input-output control unit 6, who has been authenticated by the input-output gateway server 5, requests desired data to the input-output gateway server 5 through operation with its keyboard 13. The input-output gateway server 5 then reads out data within the host computer and provides controls for transmitting the data to the input-output control unit 6. At the last step, the input-output control unit 6 outputs (prints) the received data onto an external device such as a printer installed near the location where the user is. Although the user ID is input through operation with the keyboard 13 in this embodiment, in addition to this method, the user ID may be input using the magnetic card or the IC card shown in FIG. 2.

According to this embodiment as explained above, by entering a user ID into the input-output control unit 6 through operation with its keyboard 13, only the user of the input-output control unit 6, who knows this particular user ID, is allowed to retrieve (print) data within the host computer 4. Namely, only when the user of the input-output control unit 6 is verified as a subscriber who can access the data within the host computer 4, it is allowed to output the desired data. Therefore, with regard to the security of the information, high reliability can be ensured. Accordingly, in this embodiment, the user of the input-output control unit 6 can easily access the information within the host computer 4 that provides a variety of services. Further, the information can easily be output onto an external device while the security of the information can be ensured.

Figure 10:
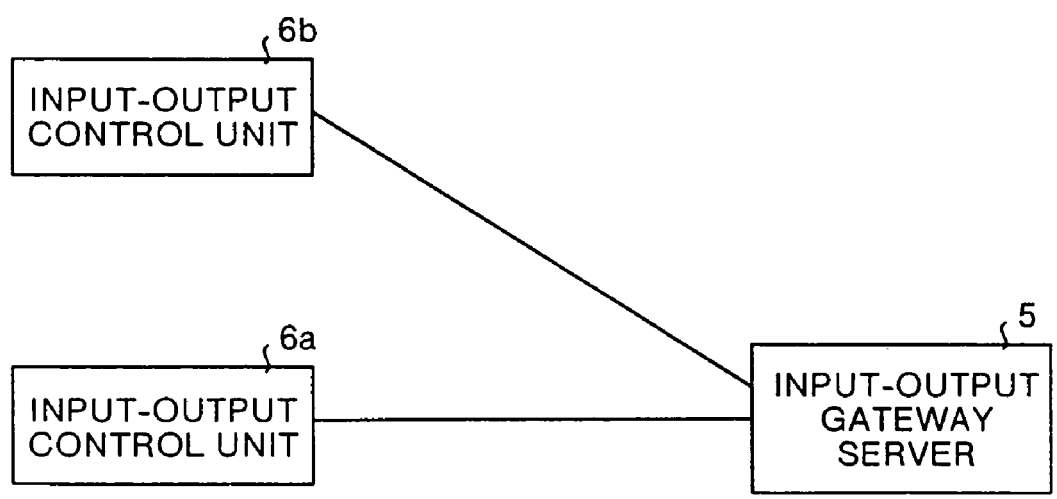
FIG. 10 shows a configuration of a fourth embodiment of the information input-output system according to this invention.
Figure 11:
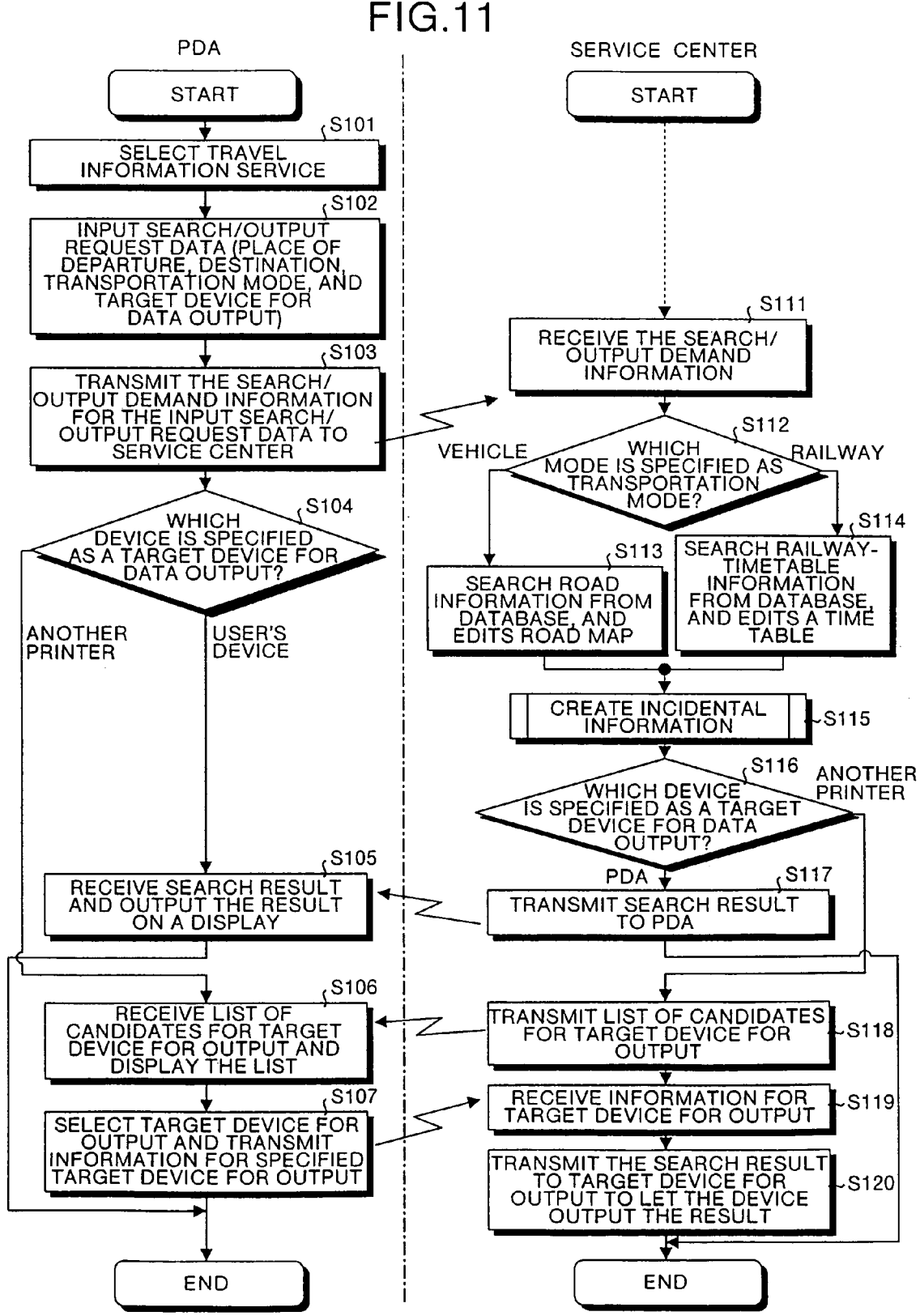
FIG. 11 shows a flow chart of the processing for output of information in the conventional information input-output system.

FIG. 10 shows a configuration of a fourth embodiment of the information input-output system according to this invention. Operation of input-output control units 6a and 6b and the input-output gateway server 5 provided in FIG. 10 is the same as that of the first embodiment previously explained.

Operation of the information input-output system based on the above configuration is explained below. In this embodiment, the operation when data captured by a scanner 12 into the input-output control unit 6b is to be printed out by the input-output control unit 6a is explained. A user ID (e.g., secret number) is input from the input-output control unit 6a to the input-output gateway server 5 through operation with its keyboard 13. In response to reception of the ID, the input-output gateway server 5 compares the received ID with the ID previously stored inside the server 5. When these two IDs match, the input-output gateway server 5 authenticates that the user of the input-output control unit 6 can access the data within the input-output control unit 6b. If these two fail to match, the input-output gateway server 5 provides controls for displaying an error message onto the input-output control unit 6a, and the user inputs the user ID again.

The user of the input-output control unit 6a, who has been authenticated by the input-output gateway server 5, requests desired data to the input-output gateway server 5 through operation with its keyboard 13. The input-output gateway server 5 then reads out the data within the input-output control unit 6b and provides controls for transmitting the data to the input-output control unit 6a. At the last step, the input-output control unit 6a outputs (prints) the received data onto an external device such as a printer installed near the location where the user is. Although the user ID is input through operation with the keyboard 13 in this embodiment, in addition to this method, the user ID may be input using the magnetic card or the IC card shown in FIG. 2.

According to this embodiment as explained above, by entering a user ID into the input-output control unit 6a through operation with its keyboard 13, only the user of the input-output control unit 6a, who knows this particular user ID, is allowed to retrieve (print) data within the input-output control unit 6b. Namely, only when the user of the input-output control unit 6a is verified as a subscriber who can access the data within the input-output control unit 6b, it is allowed to output the desired data. Therefore, with regard to the security of the information, high reliability can be ensured. Accordingly, in this embodiment, the user of the input-output control unit 6a can easily access the information within the input-output control unit 6b. Further, the information can easily be output onto an external device while the security of the information can be ensured.

As explained above, according to one aspect of this invention, by entering an authentication code into the input-output control unit through operation with a terminal or its keyboard, only the user of this terminal, who knows this particular authentication code, retrieves desired data stored in a service provision unit. Namely, only when the user of the terminal is verified as a holder (subscriber) of this terminal, it is allowed to output the desired data. Therefore, with regard to the security of the information, higher reliability can be ensured as compared to that of the conventional method. Accordingly, it is possible to obtain an information input-output system which allows the user of the terminal to easily access information within the service provision unit, and further enables easy output of the information onto an external device while the security of the information can be ensured.

According to another aspect of this invention, by entering an authentication code into the input-output control unit through operation with a terminal, only the user of this terminal, who knows this particular authentication code, retrieves desired data through the terminal. Namely, only when the user of the terminal is verified as a holder (subscriber) of this terminal, it is allowed to output the desired data. Therefore, with regard to the security of the information, higher reliability can be ensured as compared to that of the conventional method. Accordingly, it is possible to obtain an information input-output system which allows the user of the terminal to easily access information within the service provision unit, and further enables easy output of the information onto an external device while the security of the information can be ensured.

Further, the user of a terminal enters a user ID into the input-output control unit through the terminal or its keyboard, and then transmits an output command (output job code) after the user is authenticated. In response to reception of this code, the input-output control unit provides controls for output. Therefore, the output job code is transmitted only when output is required. As a result, a communication fee of waste can be eliminated.

Further, with regard to the settlement of charging, charging can surely be settled by using any device such as a cash collection device into which a specified amount of cash is previously inserted, or electronic cash.

Further, since a map is displayed on the screen of the terminal, any of input-output control units, that are installed around the location where the user is, can efficiently be specified.

According to still another aspect of this invention, by entering an authentication code into the input-output control unit through operation with its keyboard, only the user of this input-output control unit, who knows this particular authentication code, retrieves data within a service provision unit. Namely, only when the user of this input-output control unit is verified as a subscriber who can access the data within the service provision unit, it is allowed to output the desired data. Therefore, with regard to the security of the information, high reliability can be ensured. Accordingly, it is possible to obtain an information input-output system which allows the user of the input-output control unit to easily access information within the service provision unit, and further enables easy output of the information onto an external device while the security of the information can be ensured.

According to still another aspect of this invention, by entering an authentication code into the input-output control unit through operation with its keyboard, only the user of this input-output control unit, who knows this particular authentication code, retrieves data within another input-output control unit. Namely, only when the user of the specified input-output control unit is verified as a subscriber who can access the data within another input-output control unit, it is allowed to output the desired data. Therefore, with regard to the security of the information, high reliability can be ensured. Accordingly, it is possible to obtain an information input-output system which allows the user of the specified input-output control unit to easily access information within another input-output control unit, and further enables easy output of the information onto an external device while the security of the information can be ensured.

Further, the input-output control unit has devices such as a printer and a storage device (memory) as external equipment for output. Accordingly, articles can immediately be read on a retrieved newspaper or publication, and further the retrieved newspaper or publication can be stored.

Further, the input-output control unit has devices such as a sound-source data playback device and a storage device (memory) as external equipment for output. Accordingly, music can immediately be played back from received sound source data, and further the sound source data can be stored.

Further, the input-output control unit has devices such as a color printer, a digital camera, and a storage device (memory) as external equipment for output. Accordingly, received photos or video can immediately be reproduced, and further the photos and the video can be stored.

According to still another aspect of this invention, an authentication code is entered into an input-output control unit through operation with a terminal. Accordingly, only when the user of this terminal is verified as a holder (subscriber) of this terminal, it is allowed to output desired data. Therefore, with regard to the security of the information, high reliability can be ensured.

According to still another aspect of this invention, with regard to the settlement of charging, charging can surely be settled by using any device such as a cash collection device into which a specified amount of cash is previously inserted, or electronic cash.

The present document incorporates by reference the entire contents of Japanese priority documents, 11-203857 filed in Japan on Jul. 16, 1999.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An information input/output system, comprising:
a host computer having a data storage unit configured to store data;
a server connected to the host computer and configured to store a plurality of authentication codes related to a plurality of users;
a mobile communication terminal; and
a plurality of input-output control units connected to the server, wherein
the plurality of input-output control units are configured to receive from the mobile communication terminal an authentication code related to a user and an output job code corresponding to a process requested by the user, to transmit the authentication code to the server and to perform money charging and an output of data both corresponding to the output job code, and the input-output control units are installed in a plurality of locations in order to support the mobile communication terminal, whereby desired data is output to any of the input-output control units located around a destination where the user goes according to changes of the destination, and
the server is configured to allow the plurality of input-output control units to access the data in the data storage unit, and output the accessed data, when the received authentication code coincides with one of the plurality of authentication codes stored in the server, and wherein the accessed data relates to services that can be provided to the user, and wherein the plurality of input- output control units comprises:
a control section that controls operation of the plurality of input-output control units;
a communication interface that performs data transaction with the server;
a portable interface that performs communications with the mobile communication terminal; and
a printer interface adapted to be connected to a printer.

2. The information input/output system according to claim 1, wherein the data stored in the data storage unit is data that has been fetched by a scanner.

3. The information input/output system according to claim 1, wherein the authentication code is received by the plurality of input-output control units via a magnetic card or an IC card.

4. The information input/output system according to claim 1, wherein the accessed data is output by being printed out by an external device connected to the plurality of input-output control units.

5. The information input/output system according to claim 1, wherein the accessed data is at least one of data related to newspaper or publication, sound source data, static image data, and moving picture data.

6. The information input/output system according to claim 1, wherein the money charging is performed using a cash collection device, into which a specified amount of money has been deposited, or electronic money.

7. The information input/output system according to claim 1, wherein
the data is output by being printed out by an external device connected to the plurality of input-output control units, and the mobile communication terminal is configured to display a route to a location of the external device.

8. An information input/output system, comprising:
a data storage unit configured to store data;
a server configured to store a plurality of authentication codes related to a plurality of users;
a plurality of input-output control units connected to the server; and
a mobile communication terminal configured to transmit an authentication code to the input-output control unit, wherein
the data storage unit is configured to transmit the data to the mobile communication terminal, and wherein the transmitted data relates to services that can be provided to a user of the mobile communication terminal,
the plurality of input-output control units being configured to receive the authentication code and an output job code corresponding to a process requested by the user from the mobile communication terminal, the input-output control units are installed in a plurality of locations in order to support the mobile communication terminal, whereby desired data is output to any of the input-output control units located around a destination where the user goes according to changes of the destination, and to transmit the authentication code received to the server, and
the server is configured to allow the input-output control unit to output the data received by the mobile communication terminal, and perform money charging both corresponding to the output job code, when the authentication code received coincides with one of the plurality of authentication codes stored in the server, wherein the plurality of input-output control units comprises:
a control section that controls operation of the plurality of input-output control units;
a communication interface that performs data transaction with the server;
a portable interface that performs communications with the mobile communication terminal; and
a printer interface adapted to be connected to a printer.

9. The information input/output system according to claim 8, wherein the authentication code is received by the plurality of input-output control units via a magnetic card or an IC card.

10. The information input/output system according to claim 8, wherein the data is output by being printed out by an external device connected to the input-output control units.

11. The information input/output system according to claim 8, wherein the data is at least one of data related to newspaper or publication, sound source data, static image data, and moving picture data.

12. The information input/output system according to claim 8, wherein the money charging is performed using a cash collection device, into which a specified amount of money has been deposited, or electronic money.

13. The information input/output system according to claim 8, wherein the data is output by being printed out by an external device connected to the plurality of input-output control units, and the mobile communication terminal is configured to display a route to a location of the external device.

14. The information input/output system according to claim 1 further comprising a verification unit that verifies whether the user of the plurality of input-output control units is a subscriber who is allowed to handle communications between the plurality of input-output control units.

15. The information input/output system according to claim 8 further comprising a verification unit that verifies whether the user of the plurality of input-output control units is a subscriber who is allowed to handle communications between the plurality of input-output control units.

* * * * *